United States Patent [19]
McConnell

[11] Patent Number: 4,757,671
[45] Date of Patent: Jul. 19, 1988

[54] COTTON PICKER SPINDLE SEAL

[75] Inventor: Kenneth C. McConnell, Ankeny, Iowa

[73] Assignee: Deere & Company, Moline, Ill.

[21] Appl. No.: 59,341

[22] Filed: Jun. 8, 1987

[51] Int. Cl.$^4$ .................................. A01D 46/16
[52] U.S. Cl. .................................. 56/50; 56/41
[58] Field of Search .................. 56/50, 41, 44, 45, 28

[56] References Cited

U.S. PATENT DOCUMENTS

| 2,713,239 | 7/1955 | Dermid | 56/50 |
| 2,785,524 | 3/1957 | Hubbard | 56/50 |
| 2,856,744 | 10/1958 | Barbknecht et al. | 56/50 |
| 2,934,878 | 5/1960 | Barbknecht et al. | 56/50 |
| 3,387,439 | 6/1968 | Tracy | 56/50 |
| 3,606,746 | 9/1971 | Hayward | 56/50 |
| 4,133,166 | 1/1979 | Hubbard | 56/44 |

Primary Examiner—Paul J. Hirsch
Assistant Examiner—Vincent Ciamacco

[57] ABSTRACT

An improved seal assembly for a cotton picker for reducing or eliminating passage of lubricant out of the spindle assembly area to increase service interval and decrease lubricant usage. A first sealing ring contacts and seals the outer surface of the spindle. A second sealing ring, mounted over the first ring, seals non-moving components. The first seal includes a tab which is received within a corresponding notch in a bushing located adjacent the sealing assembly. The sealing assembly is constructed such that presently available cotton picker spindle assemblies may be retrofitted easily with the new arrangement.

10 Claims, 2 Drawing Sheets

U.S. Patent  Jul. 19, 1988  4,757,671
Fig. 1
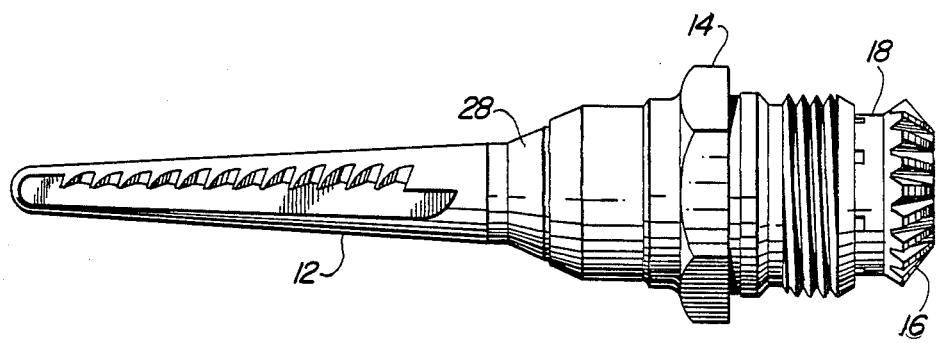
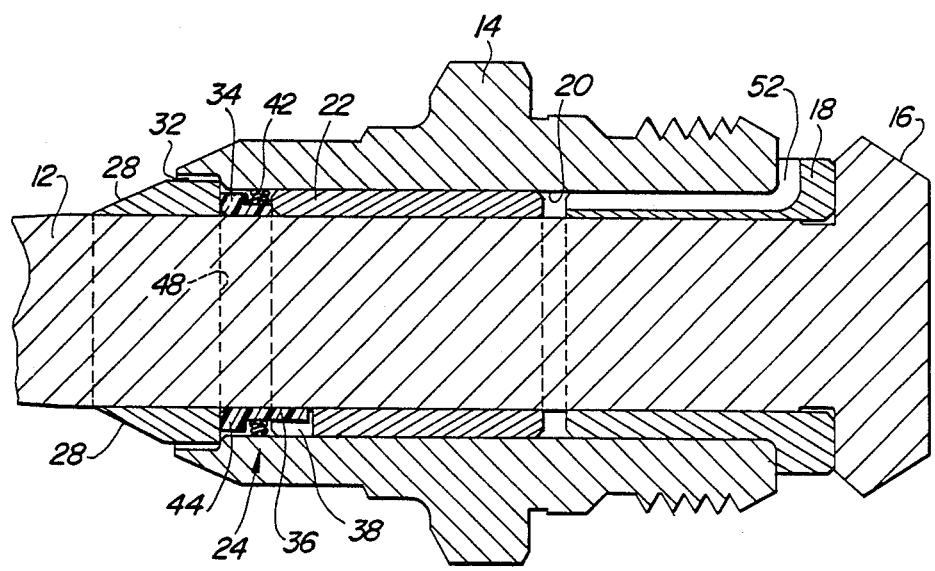
Fig. 2

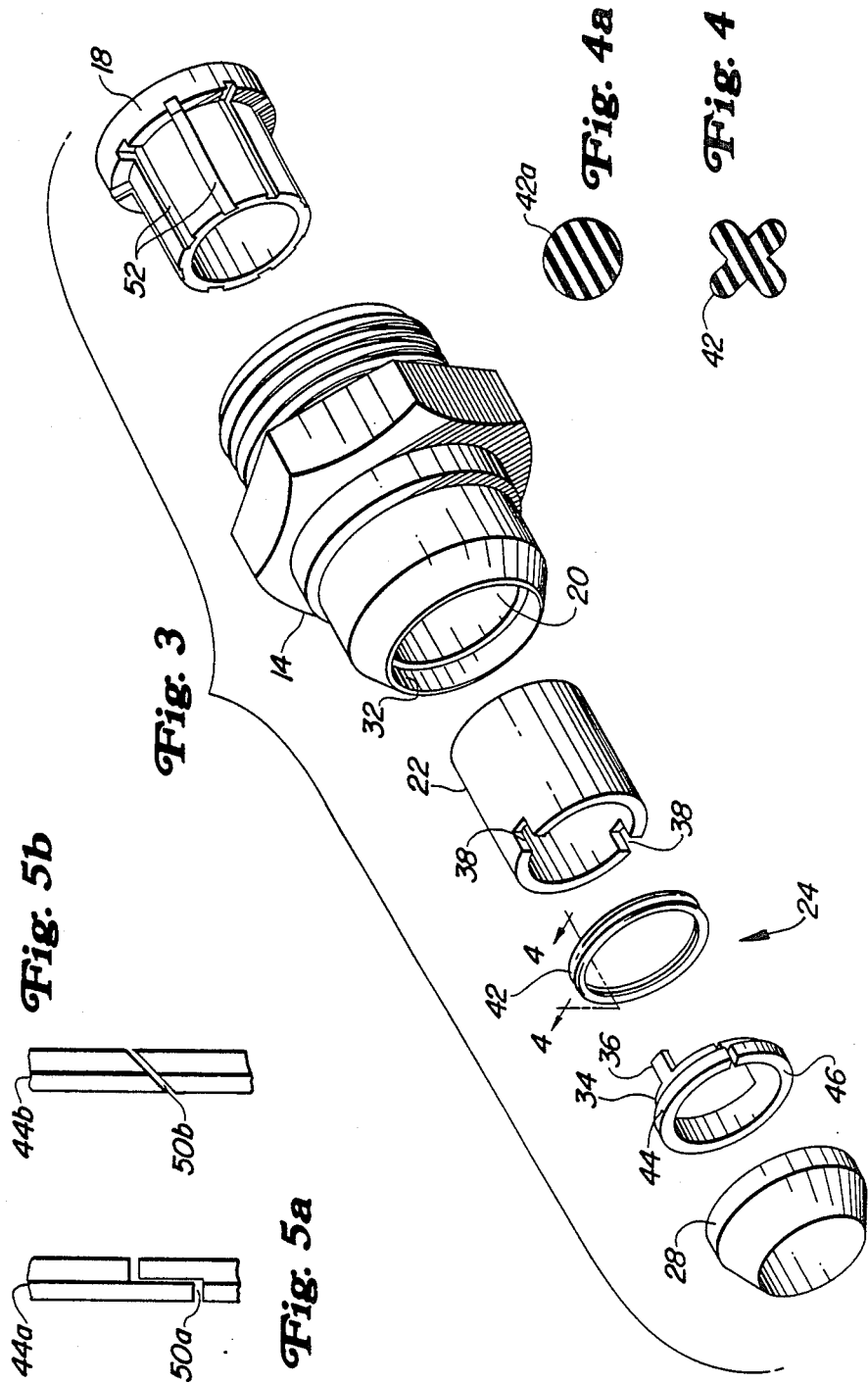

COTTON PICKER SPINDLE SEAL

BACKGROUND OF THE INVENTION

The present invention relates generally to cotton harvesters, and more specifically to an improved seal arrangement for the spindle assembly on such a harvester.

A typical cotton picker includes a row unit having a plurality of upright picker bars. A plurality of rotatable cotton picker spindles are journalled in the bars and are rotated at a very high speed. These spindles must receive a continuous supply of lubricant during operation, and retention of the lubricant within the bearings is difficult because of the high rotational speed and space limitations in the spindle bearing area. Normal sealing methods tend to fail prematurely, and maintenance of the spindle assembly becomes extremely expensive and time-consuming. The shortcomings of present sealing arrangements on cotton pickers increase the amount of lubricant required and the amount of soiling of the cotton by the lubricant. Available sealing methods which would increase the retention of the lubricant often are costly or would greatly increase drag on each spindle thereby increasing heat buildup and power requirements to drive a row unit. Other types of sealing arrangements are not easily adaptable to present spindle assembly configurations, and therefore are not retrofittable on existing spindle assemblies. Heretofore, there has not been an adequate spindle seal arrangement that seals non-moving components as well as relatively rotating components of the spindle assembly to eliminate passage of lubricant from the spindle area and permit longer intervals between service.

BRIEF SUMMARY OF THE INVENTION

It is therefore an object of the present invention to provide an improved spindle seal assembly for a cotton harvester. It is a further object to provide such a seal assembly which increases service interval, increases part life, and increases lubrication retention within the spindle assembly.

It is a further object of the present invention to provide an improved spindle seal assembly which has minimal drag but increased lubrication retention even at high spindle rotation speeds. It is a further object to provide such an assembly which is relatively inexpensive and compact. It is a further object to provide such an assembly which may be retrofitted onto existing spindle assemblies.

It is still a further object of the present invention to provide an improved spindle seal assembly which seals non-moving components as well as moving components to reduce or eliminate passage of lubricant and permits longer intervals between service. It is a further object to provide such an assembly which effectively accommodates wear and tolerance in parts.

An assembly constructed in accordance with the teachings of the present invention includes a standard bushing pressed into a conventional cotton picker spindle assembly nut. A second bushing is pressed into the opposite end of the nut and includes a pair of axially extending notches. A plastic sealing ring which is split to accommodate wear and tolerance in parts is inserted over the spindle and includes tabs which are received within the notches of the second bushing. A second sealing ring is placed over the first ring to seal non-moving components within the assembly to reduce or eliminate passage of lubricant and permit longer intervals between service. A standard dust collar is inserted over the spindle and bears axially against the end of the first plastic sealing ring. An improved seal is provided without substantially increasing the drag on the spindle. Existing spindle assemblies may be retrofitted with the improved seal simply by removing the second bushing and installing a notched bushing along with the two sealing rings.

These and other objects, features and advantages of the present invention will become apparent to those skilled in the art from the description which follows and from the drawings.

BRIEF DESCRIPTION OF THE DRAWINGS

FIG. 1 is a side view of a spindle assembly.

FIG. 2 is an enlarged sectional view showing the detail of the sealing arrangement of the spindle assembly of FIGS. 1 and 2.

FIG. 3 is an exploded perspective view of a portion of the spindle assembly of FIG. 1.

FIG. 4 is a view taken along lines 4—4 of FIG. 3 and showing a cross section of a sealing ring.

FIG. 4a is a view similar to FIG. 4 but showing an alternate embodiment of the sealing ring.

FIGS. 5a and 5b are enlarged views of alternate embodiments of the split portion of the outer sealing ring of FIGS. 2 and 3.

DESCRIPTION OF THE PREFERRED EMBODIMENT

Referring to FIG. 1, there is shown a spindle assembly 10 including a conventional cotton picker spindle 12 journalled for rotation within a conventional spindle nut 14. The spindle nut 14 is threaded and adapted to be mounted in an upright cotton picker bar (not shown). The spindle 12 includes a bevel gear 16 adapted for mating with a similar bevel gear (not shown) supported for rotation within the picker bar. For further details of the picker bar assembly and drive arrangement, reference may be had to U.S. Pat. No. 4,463,543 issued to Hubbard et al and incorporated herein by reference.

The assembly 10 includes a conventional first bushing 18 press-fitted into a cylindrical bore 20 within the spindle nut 14. A second bushing 22 is press-fitted into the bore 20 at the opposite end of the nut 14, and a seal assembly 24 is located axially outwardly of the second bushing 22. A conventional dust collar 28 is located on the shank of the spindle outwardly adjacent the seal assembly 24 and projects into an annular recess 32 at the outer end of the spindle nut 14.

As best seen in FIGS. 2 and 3 the seal assembly 24 includes a plastic sealing ring 34, preferably fabricated from a low friction, high temperature stable plastic. The sealing ring 34 includes axially projecting tabs 36. The second bushing 22 includes notches 38 adapted to receive the tabs 36 therein to position the ring 34 and prevent rotation of the ring with respect to the nut 14. The inner surface of the ring 34 is smooth and has a diameter approximately equal to the outer diameter of the shank of the spindle 12 to provide a good seal between the relatively rotating parts.

A second sealing ring 42 fabricated from resilient material is placed over the outer diameter of the first sealing ring 34 for sealing between non-moving components of the assembly 10. The second sealing ring 42 is compressed between the outer diameter of the ring 34 and the inner diameter of the spindle nut 14. In the embodiment shown in FIGS. 3 and 4 the second sealing ring 42 is a Quad ® ring (FIG. 4) available from Minnesota Rubber, Minneapolis, Minn. The outer two projections of the ring bear against the inner diameter of the bore of the nut 14 and the inner two projections bear against the outer diameter of the sealing ring 34. In an alternate embodiment (FIG. 4a) the ring 42a is in the form of a conventional O-ring.

As best seen in FIG. 3, the sealing ring 34 includes an annular collar 44 to help maintain the sealing ring 42 in a preselected axial position and to help shield the sealing ring 42 from contaminants. The collar 44 has an axially projecting face 46 adapted to bear against the rearwardly projecting face 48 of the dust collar 28.

The ring 34 includes a split portion 50 to accommodate tolerances and wear in parts. The ring 34 is free to collapse and expand along the split portion 50 to assume the correct diameter under the influence of the resilient sealing ring 42. As shown in FIG. 3, the split extends parallel to the axial direction. In one alternate embodiment, the split portion 50a (FIG. 5a) is stepped. In another alternate embodiment, the split portion 50b (FIG. 5b) is angled, preferably at an angle of about 45 degrees.

The first bushing 18 includes a lubrication path 52 for communicating lubricant from the picker bar into the journal areas of the bushings 18 and 22. The sealing ring 34 prevents lubricant from passing out along the surface of the rotating spindle shank beyond the end of the second bushing 22. The ring 42 prevents any lubricant which finds its way around the bushing 22 and sealing ring 34 from passing out through the end of the spindle nut 14. By eliminating this flow, the lubrication service interval and part life are extended, and lubrication usage and contamination are reduced. The above-described sealing arrangement provides minimal drag on each spindle and therefore does not substantially increase the power requirements for the cotton picker harvesting unit. Heat buildup is also reduced in the spindle assembly.

Except for the improved seal arrangement 24 in the area of the spindle assembly 10 adjacent the dust collar 28, the configuration of the assembly 10 is substantially identical to a conventional assembly. Therefore, by simply removing the outer bushing in a conventional assembly and replacing it with the second bushing 22 of the present assembly, and by adding the sealing rings 34 and 42, a conventional assembly may be easily retrofitted for improved sealing.

Having described the preferred embodiment, it will be apparent that modifications can be made without departing from the scope of the invention as defined in the accompanying claims.

I claim:

1. A cotton picker spindle assembly comprising:
   a cotton picker spindle support having a generally cylindrically shaped bore;
   a bushing adapted for receipt within the bore;
   a spindle having a cylindrically shaped shaft rotatably supported within the bushing;
   a first sealing ring supported at one end of the bushing within the bore and having an inner diameter approximately equal to the outer diameter of the spindle shaft and bearing thereagainst, said spindle being rotatable with respect to the first sealing ring, said first sealing ring including an outer diameter less than the inner diameter of the bore and defining with the bore an annular seal-receiving area;
   a second sealing ring mounted over the outer diameter of the first sealing ring within the seal-receiving area, said second sealing ring bearing against the outer diameter of said first sealing ring and the inner diameter of the bore for providing a relatively fluid-tight seal between the non-moving components of the spindle assembly.

2. The invention as set forth in claim 1 including a dust collar mounted over the spindle shaft and bearing axially against the first sealing ring.

3. The invention as set forth in claim 1 wherein the bushing includes at least one notch and the first sealing ring includes a projection adapted for receipt in the notch.

4. The invention as set forth in claim 1 where the first-mentioned sealing ring includes an outermost annular collar and the second-mentioned sealing ring is located between the collar and the bushing.

5. The invention as set forth in claim 1 wherein the first sealing ring includes a split portion, and the second sealing ring comprises a resilient material acting against the first ring to collapse the first ring at the split portion against the spindle shaft.

6. The invention as set forth in claim 5 wherein the split portion includes a split extending parallel to the axis of the spindle.

7. The invention as set forth in claim 5 wherein the split portion includes a stepped split.

8. The invention as set forth in claim 5 wherein the split portion includes a split extending at an angle to the axis of the spindle.

9. The invention as set forth in claim 2 wherein the first sealing ring includes an outermost annular collar having an outwardly projecting face adjacent the dust collar and an inwardly projecting face adjacent the second sealing ring.

10. The invention as set forth in claim 1 wherein the first sealing ring comprises a low friction, high temperature stable plastic.

* * * * *